United States Patent Office 3,128,265
Patented Apr. 7, 1964

3,128,265
RESINOUS COMPOSITIONS COMPRISING MIXTURES OF POLYESTERS CONTAINING QUATERNIZED AMINE GROUPS AND EPOXY RESINS
John R. Caldwell, Kingsport, Tenn., assignor to Eastman Kodak Company, Rochester, N.Y., a corporation of New Jersey
No Drawing. Filed Apr. 25, 1960, Ser. No. 24,246
10 Claims. (Cl. 260—45.4)

This invention relates to resinous polyesters and more particularly to polyesters containing quaternized tertiary amine groups that are especially useful in admixture with epoxy resins as antistatic coatings on hydrophobic films and fibers.

It is well known that films, fibers and other shaped objects made from polymeric materials that have a moisture content less than about 2% such as represented by cellulose organic esters, e.g., cellulose triacetate, cellulose propionate, cellulose butyrate or acetate butyrate, etc., by polystyrene, polyethylene, polypropylene, polyvinyl chloride, polyvinylidene chloride, etc. by polyesters of aliphatic glycols and saturated dibasic carboxylic acids and esters, e.g. polyethylene terephthalate, etc. by polyamides of aliphatic diamines and dibasic carboxylic acids, e.g. nylon and the like, have a strong tendency to develop static electrification. This is particularly disadvantageous where the films or sheets are intended for wrapping purposes or as photographic film supports and elements carrying a sensitive layer thereon such as gelatino-silver halide emulsion layer. Furthermore, it is well known that the surfaces of most of such materials are very difficult to dye. This is especially true of polyethylene films. While various coatings have been proposed heretofor to eliminate static build-ups in the above-mentioned polymeric materials, none have proven entirely satisfactory in actual commercial practice.

I have now found that physical mixtures of certain linear polyesters containing a quaternized tertiary amine group with epoxy resins give compatible, homogeneous compositions which are soluble in common organic solvents such as ethyl acetate, dioxane, and the like, and which can be applied as coatings by various means onto hydrophobic films, fibers and other shaped articles, thereby providing dyeable layers that show greatly reduced tendency to develop static electricity charges. Furthermore, the amino groups have affinity not only for certain organic dyes but also for polyvalent metals such as chromium, zinc, cobalt and copper. It thus is apparent that the coatings can serve as mordants for various types of coloring and dyeing processes. The coatings adhere firmly to the previously-mentioned hydrophobic materials and also show improved adhesive properties toward gelatin and polyvinyl alcohol, thereby making the compositions of the invention further useful as subbing layers for anchoring sensitive emulsion layers such as gelatino-silver halide emulsion to the hydrophobic film support materials. Photographic films and elements made from polystyrene, cellulose triacetate, polyethylene terephthalate, a polyester of 1,4-cyclohexanedimethanol and terephthalic acid or modifications thereof wherein part of the terephthalic acid is replaced by aliphatic dibasic carboxylic acids such as adipic, sebacic, etc. acids are also improved by the process of the invention. Low and high pressure polyethylene sheet materials after coating with thin layers of the compositions of the invention are not only antistatic in character but can be readily printed or dyed by ordinary methods.

It is, accordingly, an object of the invention to provide a new class of resinous compositions that are particularly useful for coating purposes onto films, fibers and other shaped articles imparting thereto reduced static electricity formation on handling and greatly improved printing and dyeing properties, the said compositions being homogeneous physical mixtures of certain polyesters containing a quaternized amine group with epoxy resins. Another object is to provide films, fibers and other shaped articles having a coating thereon of the new class of compositions. Another object is to provide means for preparing these materials. Other objects will become apparent hereinafter.

In accordance with the invention, I prepare my new compositions by any of the known methods of obtaining intimate mixtures but preferably by mixing the polyester with the epoxy resin by dissolving in a common solvent or by mixing emulsions of the resins. The mixtures can be isolated therefrom or employed directly as coating compositions. They may be applied to the surface to be coated by the usual methods such as rolls, sprays, dipping, etc. The proportions can vary from 5–98%, but preferably from 25–85% by weight of the polyester component and from 95–2%, but preferably from 75–15% by weight of the epoxy resin component. The coatings will cure or harden at room temperature but a shorter time of curing is obtained at elevated temperatures of from 70–150° C. Alternatively, a two-stage application process may be used, i.e. the epoxy resin may be applied to the surface to be coated first and the polyester then applied thereover while the epoxide groups are still in a reactive or uncured state. In some cases, the polyester may be applied first, followed by the epoxy resin. In either procedure, an intimate mixture is obtained. However, the procedure wherein the resin components are mixed prior to coating is the most advantageous and is preferred.

Suitable polyesters for practicing the invention include those derived from a wide variety of aliphatic and aromatic dicarboxylic acids and practically any organic dihydroxy compound. Examples of such acids contain from 4–10 carbon atoms, e.g. succinic acid, adipic acid, sebacic acid, azelaic acid, $\alpha$-ethylsuberic acid, $\alpha,\alpha$-diethyladipic acid, dimethylmalonic acid, dicarboxy diethyl ether, isophthalic acid, terephthalic acid, hexahydroorthophthalic acid, sulfonyl dipivalic acid, etc. Examples of organic dihydrdoxy compounds contain from 2–10 or more carbon atoms, e.g. glycols such as ethylene glycol, 1,4-butanediol, 1,5-pentanediol, 1,10-decanediol and other glycols of this series as well as the ether glycols such as diethylene glycol, triethylene glycol, etc. Branched chain aliphatic glycols which can be employed include 2,2-dimethyl-1,3-propanediol, 2-methyl-1,5-pentanediol, etc. Carbocyclic glycols can also be employed such as 2,2-bis(4-hydroxyphenyl)propane, 1,4-di(hydroxyethyl)benzene, 1,4-cyclohexane dimethanol, etc. Either the acid component or the glycol component contains a tertiary amine group. Acids that contain a tertiary amine group are represented by 2-dimethylaminoadipic acid, 5-dimethylaminoisophthalic acid, $CH_3N(CH_2CH_2COOH)_2$, $C_6H_5N(CH_2COOH)_2$, 3,5-dicarboxypyridine, $C_2H_5N(CH_2CH_2CH_2COOH)_2$, and the like. Glycols that contain a tertiary amine group are represented by N-methyldiethanolamine, N-butyldipropanolamine, N,N-di(2-hydroxyethyl)aniline, 2,5-di-(2-hydroxyethyl)aniline and the like. The polyesters are made by the usual methods in which the acid, an ester of the acid or the acid chloride is treated with the glycol component. The molecular weight of the polyester can vary widely, but advantageously should be 600 or higher. The polyesters may also contain free carboxyl and/or hydroxyl groups and unsaturated double bonds. A minor proportion of diamine such as tetramethylene diamine, phenylene diamine, $\alpha,\alpha$-xylylenediamine, etc. may also be used, if desired, to give the corresponding polyester-amides. The tertiary amine groups in the above-mentioned polyesters may be quaternized with alkyl or aralkyl halides, sulfates or sulfonates such as alkyl chlorides and bromides, dialkyl sulfates, aralkylbenzene chlorides and bromides, alkylbenzenesulfonates, alkyltoluenesulfonates, etc. wherein each instance the alkyl group contains from 1–4 carbon atoms, e.g. methyl, ethyl, propyl, isopropyl, butyl, etc. chlorides and bromides, dimethyl, diethyl, dipropyl, diisopropyl, dibutyl, etc. sulfates, benzyl chloride, benzyl bromide and methylbenzene, ethylbenzene, butylbenzene, methyl-p-toluene, butyl-p-toluene, etc. sulfonates prior to mixing with the epoxide resin, alternatively, the quaternization reaction may be carried out after the resins have been mixed, coated and cured. In either procedure, a mixture is obtained consisting of the quaternary salt of the polyester and the epoxy resin, such compositions coming within the previously stated range of proportions.

Suitable epoxy resins contain 2 or more epoxy groups

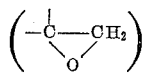

in each molecule of the resin. The 1,2-epoxide value or equivalent as used herein is measured as grams of resin containing one gram equivalent of epoxide groups. The resins may be simple, low-molecular compounds but preferably polymeric materials. They may be prepared by the reaction of phenolic compounds or aliphatic glycols with epichlorohydrins as described, for example, in C. E. Bixler, U. S. Patent No. 2,512,996, dated June 27, 1950, E. C. Shokal et al., U. S. Patent No. 2,548,447, dated April 10, 1951, S. O. Greenlee, U. S. Patent No. 2,582,985, dated Jan. 22, 1952, E. C. Shokal et al., U. S. Patent No. 2,643,239, dated June 23, 1953 and S. O. Greenlee, U.S. Patent No. 2,694,694, dated Nov. 16, 1954. The preparation of resins of this kind is also discussed in "Polymer Processes" by C. E. Schildknecht, Interscience Publishers, 934 pp. (1956). Particularly advantageous epoxy resins for practicing the invention are those prepared with polyhydric phenols such as 2,2-bis(parahydroxyphenyl)propane and epichlorohydrin which may be represented by the following structure:

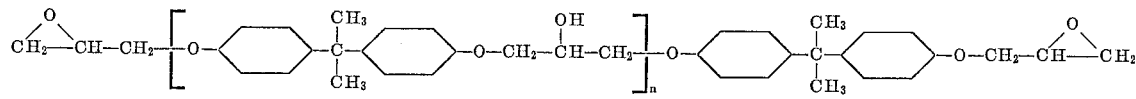

wherein *n* indicates that the grouping in the brackets may recur. Epoxy resins of this kind range from liquids to solids which have melting points up to about 150° C. and epoxide equivalents ranging from about 140 for the liquid species up to about 4000 for the solid species.

The following examples will serve to illustrate further the manner of preparing the mixtures of the invention and use thereof.

*Example 1*

A polyester of 1.0 mole of adipic acid, 0.5 mole of 1,4-butanediol and 0.5 mole of N-methyl diethanolamine was prepared by the usual ester-interchange method. 200 g. of this polyester, 100 g. of an epoxy resin, namely, a glycidyl polyether of 2,2-bis(parahydroxyphenyl) propane having a 1,2-epoxide equivalent (grams of resin containing one gram equivalent of epoxide) of 300–375, and 8 g. of diethylenetriamine were dissolved in 8 liters of dioxane.

Drafted and heat set polyethylene terephthalate film (approx. 0.003" thickness) was dipped into the solution and then heated at 140° C. for 20 minutes to cure the coating into a thin, tough layer. The coating did not crack or peel when the film was sharply creased. The coating dyed readily with acid wool dyes. Soaking the film in chromium sulfate solution resulted in the absorption of chromium ions, which served as a mordant for mordant typed dyes. Overcoatings of gelatin and polyvinyl alcohol showed good adhesion on the coated film.

A sample of the coated film was heated at 80–85° C. in a 10% by weight solution of benzyl chloride in isopropyl alcohol whereby the tertiary amine groups contained in the coating were quaternized so that the coating consisted essentially of a mixture of about 70% by weight of the benzyl chloride quaternary salt of the polyester and 30% by weight of the epoxy resin. The treated film showed little or no tendency to develop static electricity charges.

The dioxane coating solution was also applied to polyester fibers made from terephthalic acid and cyclohexane-1,4-dimethanol. The fibers dyed well with acid wool dyes and after the quaternization treatment showed a greatly reduced tendency to develop static electricity charges.

Similar good antistatic coatings on polyester films and fibers were obtained with the above coating mixture wherein the polyester was quaternized with benzyl chloride prior to mixing the epoxy resin.

In place of the polyester in the above example, there can be substituted a like amount of a polyester obtained by heating a mixture of 0.4 mole adipic acid, 0.2 mole of diethylene glycol and 0.2 mole of N-methyl diethanolamine, at 180–200° C. for 2 hours and then at 220° C. for 4 hours, or a like amount of a polyester obtained by heating a mixture of 0.2 mole of adipic acid, 0.1 mole of diethylene glycol and 0.15 mole of N,N-di(2-hydroxyethyl) aniline, at 180–200° C. for 2 hours, and then at 220° C. for 4 hours, or a like amount of a polyester of equimolar proportions of 5-dimethylaminoisophthalic acid and 1,5-pentanediol having a molecular weight of 3000–4000. Also, in place of the epoxy resin in the above example, there can be substituted a like amount of glycidyl polyether of 2,2-bis(parahydroxyphenyl) propane having a 1,2-epoxide equivalent of 225–290 or 450–525 and the like, to give generally similar products. Thus, all of these are likewise readily dyeable with either cellulose acetate or acid wool dyes or both and possess excellent antistatic properties being particularly useful for providing antistatic coatings on films, fibers and fabrics such as prepared with polyethylene terephthalate, 1,4-cyclohexanedimethanol terephthalate polyester, polypropylene, polystyrene, cellulose triacetate, etc.

*Example 2*

A polyester was prepared having the composition 1.0 mole of azelaic acid +0.4 mole of 1,5-pentanediol +0.6 mole of N-ethyldiethanolamine. 200 g. of the above polyester, 120 g. glycidyl polyether of 2,2-bis(parahydroxyphenyl) propane having a 1,2-epoxy equivalent of 300–375 and 8 g. of diethylenetriamine were dissolved in 6000 cc. of ethyl acetate and the mixture was sprayed onto drafted polystyrene film. The add-on formed a coating 0.0004 inch thick, on a dry basis. The solvent was evaporated and the coated film was heated at 50–60° C. for 3 hours to cure the resin. The treated film was then passed through a 0.1% by weight solution of methyl p-toluenesulfonate in isopropyl alcohol. The solvent was evaporated and the film heated at 60–70° C. for two hours to quaternize the amine groups, thereby resulting in a coating consisting essentially of a mixture of about 70% by weight of the methyl p-toluenesulfonate quaternary salt of the polyester and 30% by weight of the epoxy resin. This treated film showed greatly improved antistatic properties as compared with the film just prior to the quaternization. Excellent adhesion was obtained with gelatin and polyvinyl overcoatings.

*Example 3*

Polyethylene terephthalate film coated by the nonquaternized composition and procedure of Example 1 was heated at 80–85° C. in a 10% by weight solution of ethyl benzenesulfonate in isopropyl alcohol. The tertiary amine groups were quaternized, thereby resulting in a coating consisting essentially of a mixture of about 65% by weight of the ethyl benzenesulfonate quaternary salt and 35% by weight of the epoxy resin. The coated and treated film showed excellent antistatic properties.

*Example 4*

A sheet made from cyclohexanedimethanol terephthalate polyester was passed through a solution composed of 1 part by weight of a polyester of 0.2 mole of adipic acid, 0.1 mole of diethylene glycol and 0.1 mole of N,N-di(2-hydroxyethyl) aniline, 1 part by weight of a glycidyl polyether of 2,2-bis(parahydroxyphenyl) propane having a 1,2-epoxide equivalent of 300-375 and 100 parts by weight of ethyl acetate. After curing at 130–140° C. for 10–15 minutes, the coated sheet was heated in a 10% by weight solution of benzyl chloride in benzene to quaternize the amine groups so that the coating consisted essentially of a mixture of about 55% by weight of the benzyl chloride quaternary salt of the polyester and 45% by weight of the epoxy resin. The treated sheet showed improved resistance to static electrification as compared to the same sheet prior to the quaternization step.

*Example 5*

A cellulose triacetate fabric was soaked in a solution of the resinous composition prepared according to the process of Example 4 except that the polyester component was quaternized with benzyl chloride prior to dissolution with the epoxy resin in ethyl acetate. The coating composition consisted essentially of a mixture of about 50% by weight of the benzyl chloride quaternary salt of the polyester and 50% by weight of the epoxy resin. After pressing, the fabric showed a 2% gain in weight on a dry basis. It was then heated at 120–130° C. for 10 minutes. The fabric could be printed readily. It also dyed well with acid wool dyes. On handling the fabric, no static electricity build up could be detected. Alternatively, the cellulose acetate fabric can be treated with the specific solution of Example 4, followed by quaternization of the coating.

*Example 6*

One hundred g. of the non-quaternized polyester described in Example 1, 100 g. of a glycidyl polyether of 2,2-bis(parahydroxyphenyl) propane having a 1,2-epoxide equivalent of 225–290 and 35 g. of a polyethylene glycol ether of sorbitan monopalmitate were placed in a colloid mill with 3000 cc. of water. The mixture was agitated to give an emulsion and 8 g. of diethylenetriamine was added. The emulsion was applied to films of drafted and heat-set polyethylene terephthalate. The water was evaporated and the films were heated at 120–130° for 15 minutes to cure the epoxy resin. The amino groups were then quaternized by heating the films in an alcohol solution of diethyl sulfate, thereby resulting in a coating consisting essentially of a mixture of about 70–75% by weight of the diethyl sulfate quaternary salt of the polyester and 30–25% by weight of the epoxy resin. The films had a strong affinity for acid dyes and were highly resistant to static electricity.

By following the procedures set forth in the above examples, other mixtures containing quaternary nitrogen groups of the mentioned polyesters and epoxy resins can be prepared. These also provide coatings that adhere well to hydrophobic films, fibers and fabrics of the mentioned kind imparting thereto desirable dyeing and antistatic properties. All of the mixtures of the invention have utility as subbing or anchoring layers for photographic elements by reasons of their compatibility with gelatin and polyvinyl alcohol which function as carriers or vehicles for light sensitive emulsions, for example, gelatino-silver halide emulsion layers. If desired, the mixtures can also contain appropriate dyes, pigments, fillers, and the like.

The invention has been described in detail with particular reference to preferred embodiments thereof, but it will be understood that variations and modifications can be effected within the spirit and scope of the invention as described hereinabove and as defined in the appended claims.

What I claim is:

1. A resinous composition comprising a mixture of (1) from 5–98% by weight of a polyester of a dibasic carboxylic acid component containing from 4–10 carbon atoms and at least one organic dihydroxy component containing from 2–10 carbon atoms at least one of said components, containing an amine group which is quaternized by a quaternizing agent selected from the group consisting of an alkyl chloride, an alkyl bromide, a dialkyl sulfate, an alkylbenzenesulfonate, an alkyltoluenesulfonate and benzyl chloride wherein in each instance the said alkyl group contains from 1–4 carbon atoms, and (2) from 95–2% by weight of a glycidyl polyether of a material selected from the group consisting of polyhydric phenols and polyhydric aliphatic alcohols, said glycidyl polyether having at least two epoxy groups in each molecule.

2. A resinous composition comprising essentially a mixture of (1) from 25–85% by weight of the benzyl chloride quaternary salt of a polyester of 1.0 mole of adipic acid, 0.5 mole of 1,4-butanediol and 0.5 mole of N-methyldiethanolamine, and (2) from 75–15% by weight of a glycidyl polyether of 2,2-bis(parahydroxyphenyl) propane having a 1,2-epoxide equivalent of 300–375.

3. A resinous composition comprising a mixture of (1) from 25–85% by weight of the methyl p-toluenesulfonate salt of a polyester of 1.0 mole of azelaic acid, 0.4 mole of 1,5-pentanediol and 0.6 mole of N-ethyldiethanolamine, (2) from 75–15% by weight of a glycidyl polyether of 2,2-bis(parahydroxyphenyl) propane having a 1,2-epoxide equivalent of 300–375.

4. A resinous composition comprising a mixture of (1) from 25–85% by weight of the benzyl chloride quaternary salt of a polyester of 1.0 mole of adipic acid, 0.5 mole of 1,4-butanediol and 0.5 mole of N-methyldiethanolamine, and (2) from 75–15% by weight of a glycidyl polyether of 2,2-bis(parahydroxy-phenyl) propane having a 1,2-epoxide equivalent of 225–290.

5. A resinous composition comprising a mixture of (1) from 25–85% by weight of the ethyl benzenesulfonate quaternary salt of a polyester of 1.0 mole of adipic acid, 0.5 mole of 1,4-butanediol and 0.5 mole of N-methyldiethanolamine, and (2) from 75–15% by weight of a glycidyl polyether of 2,2-bis(parahydroxyphenyl) propane having a 1,2-epoxide equivalent of 300–375.

6. A resinous composition comprising a mixture of (1) from 25–85% by weight of the benzyl chloride quaternary salt of a polyester of 0.2 mole of adipic acid, 0.1 mole of diethylene glycol and 0.1 mole of N,N-di(2-hydroxethyl) aniline, and (2) from 75–15% by weight of a glycidyl polyether of 2,2-bis(parahydroxyphenyl) propane having a 1,2-epoxide equivalent of 300–375.

7. An antistatic hydrophobic material selected from the group consisting of a cellulose organic ester, polyethylene terephthalate, a polyester of 1,4-cyclohexanedimethanol and terephthalic acid, polystyrene, polyethylene and polypropylene, the said material having thereon a coating of the resinous composition of claim 1.

8. Polyethylene terephthalate film coated on at least one side thereof with the resinous composition of claim 5.

9. A polyester of 1,4-cyclohexanedimethanol and terephthalic acid in the form of a sheet coated on at least one side with a resinous composition comprising a mixture of (1) from 25–85% by weight of the benzyl chloride quaternary salt of a polyester of 0.2 mole of adipic acid, 0.1 mole of diethylene glycol and 0.1 mole of N,N-di(2- hydroxyethyl) aniline, and (2) from 75–15% by weight of a glycidyl polyether of 2,2-bis(parahydroxyphenyl) propane having a 1,2-epoxide equivalent of 300–375.

10. A fabric of cellulose triacetate coated with a resinous composition comprising a mixture of (1) from 25–85% by weight of the benzyl chloride quaternary salt of a polyester of 0.2 mole of adipic acid, 0.1 mole of diethylene glycol and 0.1 mole of N,N-di(2-hydroxyethyl) aniline, and (2) from 75–15% by weight of a glycidyl polyether of 2,2-bis(parahydroxyphenyl) propane having a 1,2-epoxide equivalent of 300–375.

References Cited in the file of this patent

UNITED STATES PATENTS

| | | |
|---|---|---|
| 2,563,289 | Steinman | Aug. 7, 1951 |
| 2,626,223 | Sattler et al. | Jan. 20, 1953 |
| 2,744,086 | Mowry et al. | May 1, 1956 |
| 2,830,031 | Fisch | Apr. 8, 1958 |

FOREIGN PATENTS

| | | |
|---|---|---|
| 210,036 | Australia | Mar. 8, 1956 |